S. A. ROGERS.
TRACTION SYSTEM FOR CABLE RAILWAYS.
APPLICATION FILED DEC. 15, 1920.
1,386,533. Patented Aug. 2, 1921.
2 SHEETS—SHEET 1.
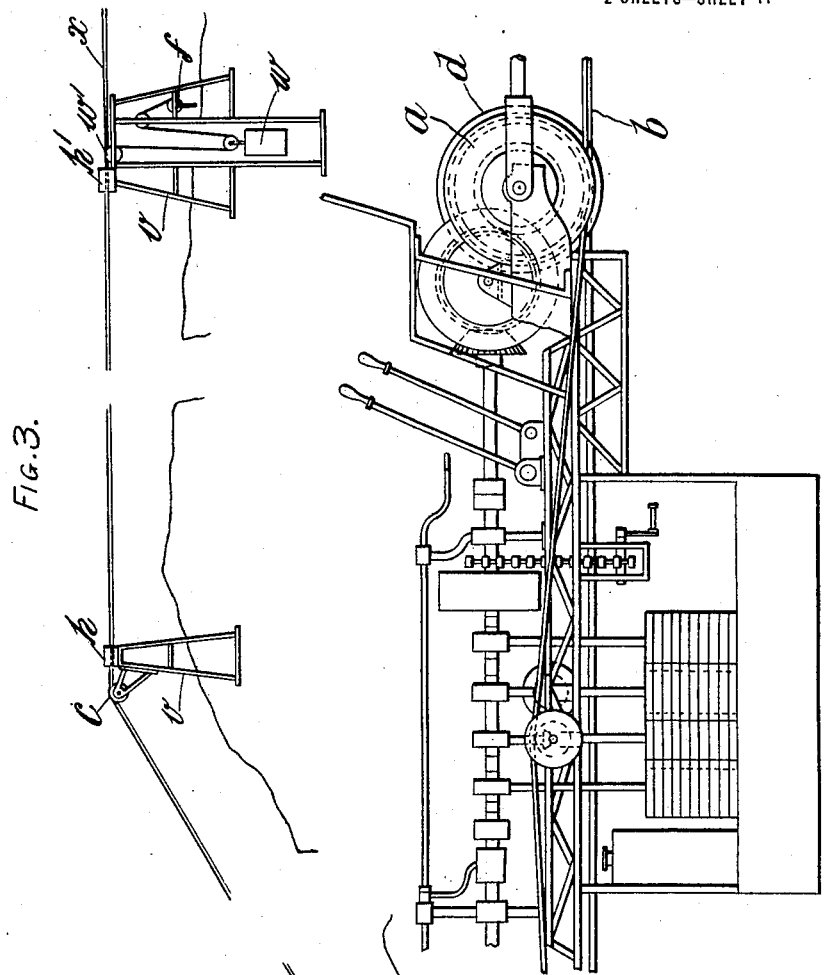
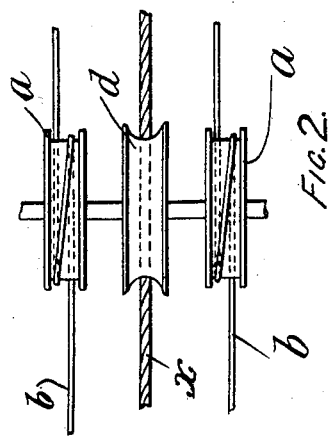
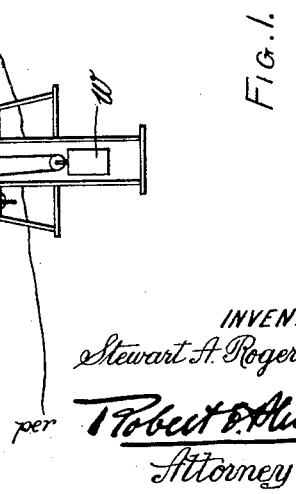
INVENTOR
Stewart A. Rogers
per Robert P. Phillips
Attorney

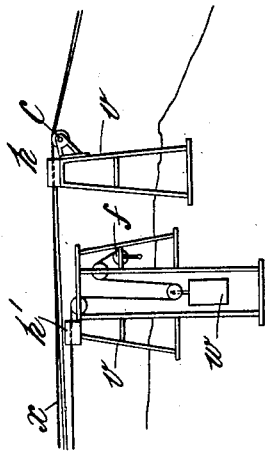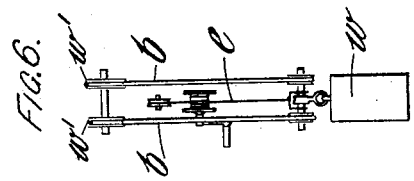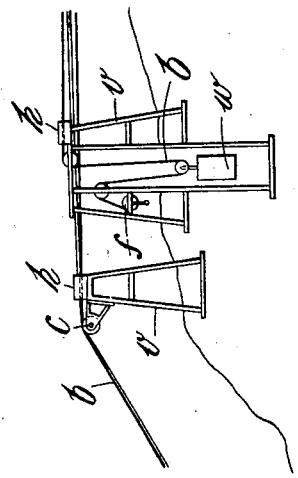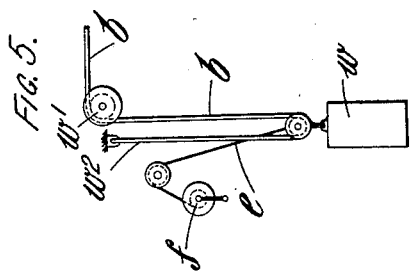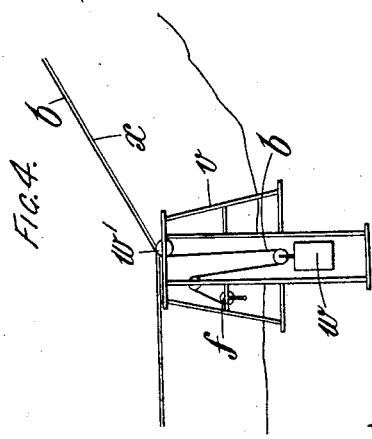

UNITED STATES PATENT OFFICE.

STEWART ALEXANDER ROGERS, OF BUENOS AIRES, ARGENTINA.

TRACTION SYSTEM FOR CABLE-RAILWAYS.

1,386,533.  Specification of Letters Patent.  Patented Aug. 2, 1921.

Application filed December 15, 1920. Serial No. 431,034.

*To all whom it may concern:*

Be it known that I, STEWART ALEXANDER ROGERS, a subject of the King of Great Britain and Ireland, residing at 270 Belgrano, in the city of Buenos Aires, in the State of Buenos Aires, Republic of Argentina, have invented a new and useful Improvement in Traction Systems for Cable-Railways, of which the following is a specification.

This invention relates to traction systems for elevated cable ways and has for its object extending the use of same—where self-contained power units are used for traction purposes—to hilly country which necessitates the cable way or ways being laid with gradients.

Hitherto this has not been possible owing to the inability to obtain the necessary adhesion or grip on the cable way with the limitations imposed on the self-contained power units of such systems.

According to the present invention I employ an auxiliary traction system which consists essentially of a pair of cables hereinafter designated "driving" cables located one on either side of the rail cable or cables, of two or more driving drums on the power unit or on one of the carriers or trolleys in driving connection said drums being located one on each side of said unit and of means whereby said cables can readily be engaged with said drums by winding them one or more turns thereon and disengaged from said drums by unwinding them therefrom. This arrangement also enables the power unit to be more efficiently used for braking purposes on down gradients.

The driving cables are supported and kept in the necessary state of tension by any suitable devices and means.

In the accompanying drawings which illustrate this invention as applied to a single cable way:—

Figures 1 and 2 are views in side elevation and plan respectively showing the relative dispositions of the rail cable and trolley wheels and the driving cables and driving drums.

Fig. 3 is a diagrammatic view showing the general lay out of the auxiliary traction system as applied to a gradient lying between two level or approximately level plains.

Fig. 4 is a similar view showing the lay out as applied to two opposed and adjacent gradients, and Figs. 5 and 6 are views in elevation—on an enlarged scale—showing a convenient arrangement for manipulating the driving cables for the purpose of enabling said cables to be engaged with and disengaged from the driving drums.

Throughout the views similar parts are marked with like letters of reference.

Two driving drums $a$ and $a$ are fixed on the axle of one of the driving wheels $d$ of the power unit one on each side thereof said drums being of the same diameter as said driving pulleys.

The driving cables $b$ and $b$ which are arranged one on either side of the rail cable $x$ and are only diagrammatically shown in the accompanying drawings are supported by pulleys $c$ which are preferably carried by the same supports as carry the pulleys for supporting and carrying the rail cable and said cables are kept in a state of tension by counterweights $w$ which are suspended from loops in the cables $b$ caused by their passing over suitable guide pulleys $w'$ carried by supports $v$. The end of the cable $b$ is wound on the drum of a winch $f$ which provides means for lifting said weights and thus enabling the tension on the cables to be removed. The preferred construction and arrangement is that shown in Figs. 5 and 6 in which a single counterweight operates to keep the driving cables $b$ in a state of tension and in which the counterweight $w$ is raised by a direct acting cable $e$.

The driving cables are carried for such a distance beyond the top of the gradient as will allow the complete train to be under the control of said cables after it has left the gradient and at each end said cables after passing over the last or terminal supporting pulley $c$ are provided with the tensioning devices as before described.

At each gradient are two pairs of clamping devices $h$ and $h'$, the former located at the top of the gradient and $h'$ at a suitable distance beyond the top of the gradient. These clamping devices may be of any suitable hand operated type.

The manipulation of the auxiliary traction system is as follows:—When the train reaches the foot of a gradient the winch $f$ is operated to raise the counterweight $w$ to enable the tension on the driving cables $b$ to be removed, said cables being fixed at the top of the incline either by the pair of clamps $h$ or by the pair of clamps $h'$ according to the direction of travel of the last train and thereby makes them sufficiently slack to enable them to be wound on the driving drum *a*. When this has been effected the winch *f* is operated to restore the tension of the cables and the train is started. When the train reaches the top of the gradient if the clamps *h* are non-operative the train will pass over them. If said clamps are operative the clamps *h'* are operated to grip the cables and the clamps *h* are released so that the train can pass over them. When the train reaches the clamps *h'*, the clamps *h* are operated to grip the cables and the clamps *h'* to release them. The winch *f* at the top of the gradient is then operated to enable the tension on the driving cables to be removed—which are now held by the clamps *h*—and thus permit said cables being removed from the driving drums.

When the train reaches the top of a down gradient it is engaged with the driving cables to enable the power unit to operate as a brake, the manipulation being as follows:—The clamps *h* are first operated to grip the driving cables—the clamps *h'* being inoperative—and then the tension is removed from said cables by operating the adjacent winch *f*. After the cables have been wound on the driving drums the winch is manipulated to render the counterweights operative, the clamps *a'* are operated to grip the cables and the clamps *h* are released. The train can now proceed down the gradient under the braking power of the power unit. On reaching the bottom of the gradient the tension on the length of said cables beyond the clamps *h* is released by operating the winch at the foot of the gradient as before described.

When there is an up and down gradient near to one another the driving cables of the two inclines are arranged to overlap as shown in Fig. 4 so that the one pair of cables can be engaged with the driving drums of the train as soon as the other pair of cables have been disengaged from said drums and vice versa.

I wish it to be understood that the positions of the cables, tensioning weights and the clamping devices may be modified to suit particular contours of the ground or other conditions or circumstances.

For the purpose of distributing or increasing the driving traction driving drums may be employed in connection with the carrier trolleys or trucks said drums being mounted on the axles carrying the wheels of said trolleys or trucks and untilized in connection with the driving cables as before stated.

Although this auxiliary traction system is primarily intended for use on gradients it may be employed on level or approximately level tracks when circumstances call for it.

What I claim is:—

1. An auxiliary traction system for cable ways comprising two drums mounted on any driven parts of the power unit one on either side thereof said drums being of the same diameter as the driving wheels of said unit, two driving cables arranged one on either side of the cable way, clamping devices for anchoring said driving cables, means for keeping said driving cables in a state of tension, and means for removing the tension from said driving cables.

2. An auxiliary traction system for cable ways comprising two drums mounted on any driven part of the power unit one on either side thereof said drums being of the same diameter as the driving wheels of said unit, two driving cables arranged one on either side of the cable way, means for supporting said driving cables, clamping devices for anchoring said driving cables, means for keeping said driving cables in a state of tension, and means for removing the tension from said driving cables.

3. An auxiliary traction system for cable ways comprising two drums mounted on an axle carrying one of the driven wheels of one of the carrier trolleys one on either side thereof said drums being of the same diameter as said wheel of said unit, two driving cables arranged one on either side of the cable way, means for supporting said driving cables, clamping devices for anchoring said driving cables, means for keeping said driving cables in a state of tension, and means for removing the tension from said driving cables.

4. An auxiliary traction system for cable ways comprising two drums mounted on a driven part of the power unit one on either side thereof said drums being of the same diameter as the driving wheels of said unit, two drums mounted on the axle carrying one of the driven wheels of one of the carrier trolleys one on either side thereof said drums being of the same diameter as the driving wheel of said unit two driving cables arranged one on either side of the cable way, means for supporting said driving cables, counterweights for keeping said driving cables in tension, means for raising said weights to take or enable the tension to be taken off said driving cables and clamping devices for anchoring said driving cables.

5. An auxiliary traction system for cable ways comprising two drums mounted on a driven part of the power unit one on either side thereof said drums being of the same diameter as the driving wheels of said unit, two drums mounted on the axle carrying one of the driven wheels of one of the carrier trolleys one on either side thereof, said drums being of the same diameter as said wheel of said unit, two driving cables arranged one on either side of the cable way, means for supporting said driving cables which will allow the driving drums to pass over them, counterweights for keeping said driving cables in tension, means for raising said weights for the purpose of taking the tension off said driving cables and clamping devices for anchoring said driving cables said devices being located in advance of said tensioning devices.

6. In a traction system in which auxiliary driving cables are employed a lay out in which a clamping device is located at the top of the gradient, a second clamping device is located at the top of the gradient at a suitable distance from the first clamping device a tensioning device and a tension releasing device at the foot of the gradient, and a tensioning device and a tension releasing device at the top of the gradient beyond the second clamping device.

7. In an auxiliary traction system for cable ways the combination with the cable way of two drums mounted on a driven part of the power unit one on either side thereof said drums being of the same diameter as the driving wheels of said unit, two driving cables arranged one on either side of the cable way, two clamping devices located at the top of the gradient at a suitable distance apart, two devices for keeping the driving cable in a state of tension one of said devices being located at the foot of the gradient and the other at the top thereof beyond the second clamping device, and tension releasing devices co-acting with the tensioning devices.

8. An auxiliary traction system for cable ways comprising two drums mounted on the axle carrying one of the driven wheels of one of the carrier trolleys one on either side thereof said drums being of the same diameter as the wheel of said unit, two driving cables arranged one on either side of the cable way, means for supporting said driving cables which will allow the driving drums to pass over them, a clamping device located at the top of the gradient, a second clamping device is located at the top of the gradient at a distance from the first clamping device, a tensioning device and a tension releasing device at the foot of the gradient, and a tensioning device and a tension releasing device at the top of the gradient beyond the second clamping device.

STEWART ALEXANDER ROGERS.